Nov. 23, 1948.  C. A. LEONARD  2,454,659
ELECTRICALLY CONTROLLED GOVERNOR
Filed Jan. 10, 1945  2 Sheets-Sheet 1
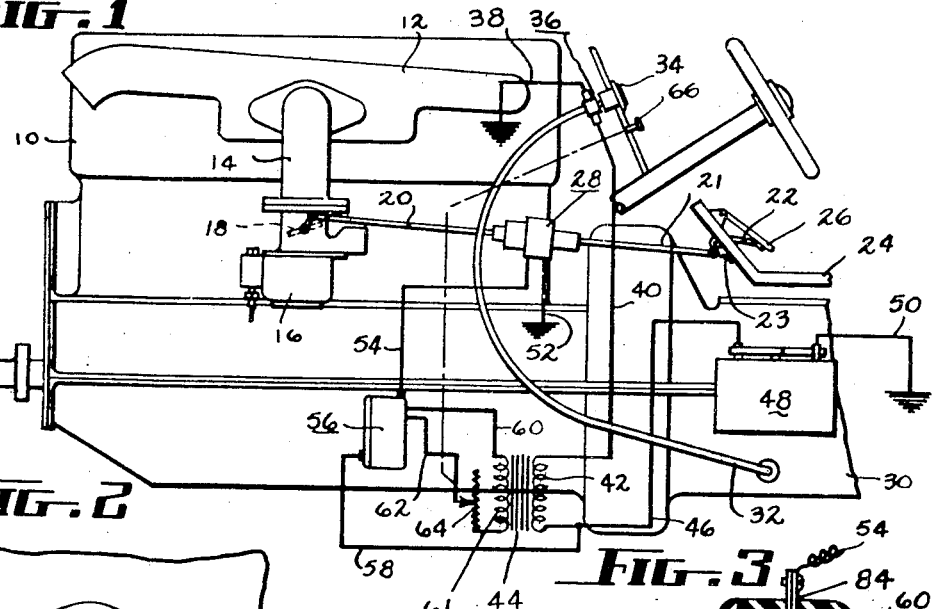
INVENTOR
CHARLES A. LEONARD
BY
Toulmin & Toulmin
ATTORNEYS Nov. 23, 1948.  C. A. LEONARD  2,454,659
ELECTRICALLY CONTROLLED GOVERNOR
Filed Jan. 10, 1945  2 Sheets-Sheet 2
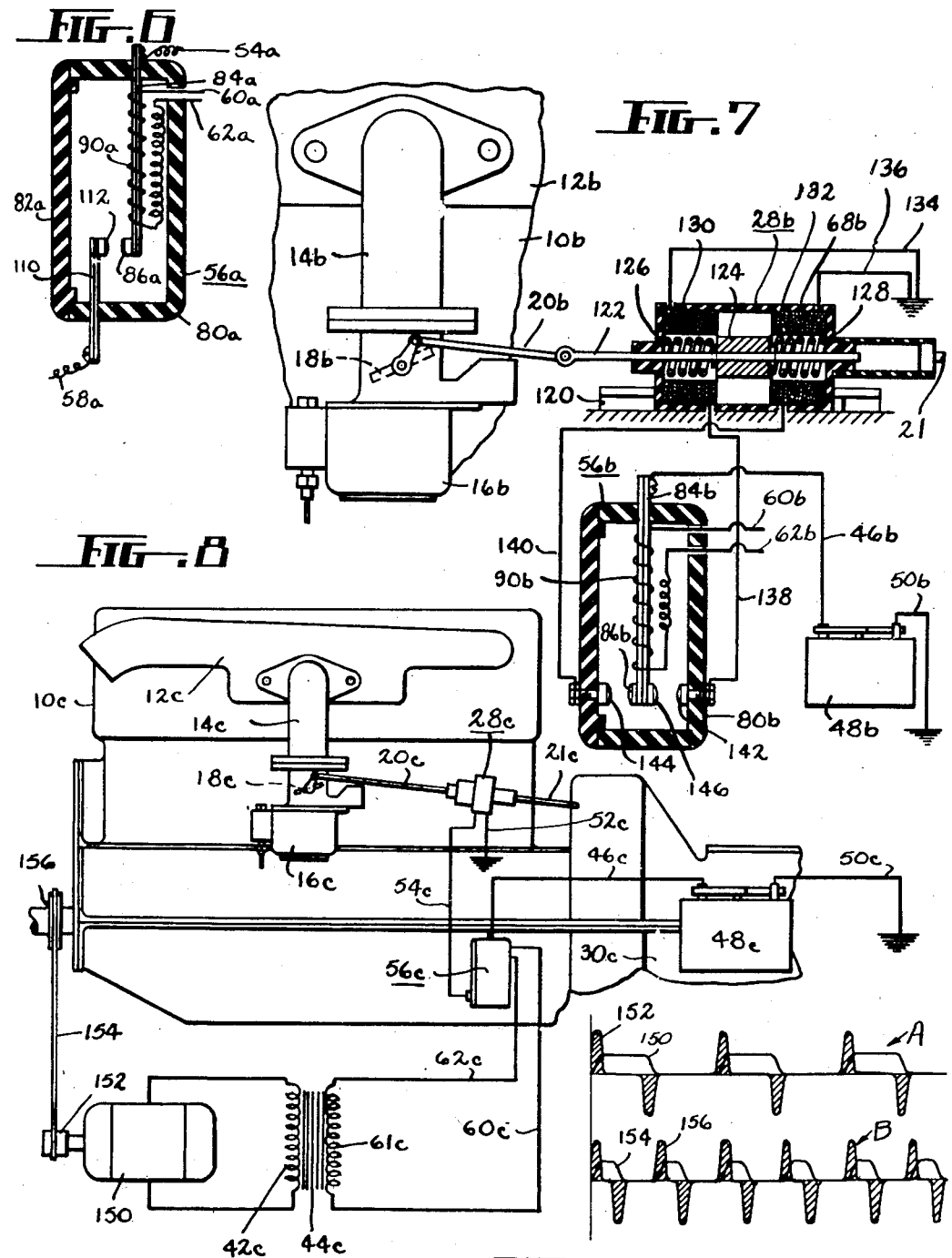
INVENTOR
CHARLES A. LEONARD
BY
Toulmin & Toulmin
ATTORNEYS Patented Nov. 23, 1948

2,454,659

UNITED STATES PATENT OFFICE 2,454,659

ELECTRICALLY CONTROLLED GOVERNOR

Charles A. Leonard, Cincinnati, Ohio

Application January 10, 1945, Serial No. 572,233

25 Claims. (Cl. 180—82.1)

This invention relates to governors and, especially, to governors adapted for controlling the speed of internal combustion engines.

It is a particular object of this invention to provide an electrically actuated governor for an internal combustion power plant such as an automobile or truck engine.

It is another object to provide an electrical governor adapted for controlling the speed of an internal combustion engine and having associated therewith a bi-metal controller for the electrical governor.

It is another object to provide a control means which will maintain the speed of an internal combustion engine between predetermined limits, the said control system comprising a bi-metal strip.

It is another object to provide a governor for controlling the speed of an automotive vehicle which includes electrical means responsive to the speed of the vehicle for actuating the speed controlling system.

It is another object to provide a control system according to the foregoing objects in which the electrical speed measuring means is controlled by the rotational speed of a conventional speedometer cable.

These and other objects and advantages will become more apparent upon reference to the accompanying drawings, in which:

Figure 1 is a diagrammatic view of an automobile or truck engine having a speed governor according to this invention;

Figure 2 is an enlarged view of a portion of the device of Figure 1;

Figure 3 is an enlarged sectional view through a thermal responsive switch employed in the control circuit of Figure 1;

Figure 4 is an enlarged sectional view showing a commutator device employed in the circuit of Figure 1;

Figure 5 is a section through the commutator device of Figure 4 and is indicated by the line 5—5 on Figure 4;

Figure 6 is a section through a modified form of thermal responsive switch and is similar to Figure 3;

Figure 7 is a view showing a modified arrangement of a portion of the control device of Figure 1;

Figure 8 is a diagrammatic view of an engine having a control device similar to that of Figure 1 but including an alternator driven from the engine shaft rather than a commutator device; and Figure 9 is a view diagrammatically illustrating the currents in the primaries and secondaries of the transformer under two different conditions of engine speed.

General arrangement

This invention comprises, generally, a control system adapted to be connected with the butterfly valve or other control in the intake manifold of an internal combustion engine. A portion of the control device consists of an electrically actuated link for lengthening or shortening the rod which actuates the butterfly valve so that the latter is opened or closed in accordance with the response of the control system.

Connected with the electrical link is a bi-metal strip which carries a contact adapted to engage with one or more stationary contacts. The bi-metal strip has associated with it an electrical heating unit which is connected with a source of electrical power, the output of which is a function of the speed of the engine which it is desired to control.

The source of power for heating the bimetal strip preferably comprises a transformer whose secondary is connected with the heater of the said bi-metal strip and, whose primary is connected through a commutator device with the vehicle battery. The commutator device is arranged to rotate at a speed proportional to the speed of an engine or of the vehicle. Thus, a pulsating current proportional to the speed which is being controlled is obtained from the transformer secondary so that the bi-metal strip is heated to a degree which is a measure of the speed being controlled.

Optionally, an alternator may be connected with the motor shaft so that the output of the said alternator is proportional in frequency and voltage to the engine speed. The output of the alternator may be passed through a transformer and be employed for heating the bi-metal heater.

Also, optionally, the bi-metal strip may make contacts in both directions of its movement so that the control rod to the butterfly valve may be actuated to close the said butterfly in response to too great a car speed and also to open the said butterfly in response to too low a car speed.

Structural arrangement

Referring to the drawings more in detail and, particularly, to Figures 1 to 5, inclusive, there is shown an engine 10 of a conventional type such as is used in trucks and automobiles. The engine comprises an intake manifold at 12 which is connected by an intake pipe 14 with a carburetor generally indicated at 16. A butterfly valve at 18 is effective to vary the communication between the carburetor 16 and the pipe 14.

A rod 20 is connected with the butterfly 18 to rotate the same and is joined at its other end with a bellcrank lever 22 which is pivoted to and extends through the floor 24 of the vehicle cab. A lever 26 is pivoted to the floor 24 and is adapted for actuation by the operator's foot to reciprocate the rod 19 and thus to vary the position of the butterfly 18. The rod 20 comprises an electrical link generally designated at 28 whose function will be more fully set forth hereinafter.

The engine 10 drives through a transmission 30 in the conventional manner into a drive shaft not shown. A speedometer cable at 32 is connected into the transmission 30 and leads to an indicating instrument 34 on the dash-board of the vehicle cab. A commutator device generally indicated at 36 is mounted in the speedometer cable behind the speedometer 34 and is connected by a wire 38 to ground and by a second wire 40 to one terminal of the primary 42 of a transformer generally indicated at 44. The other terminal of the primary 42 is connected by a wire 46 with one terminal of a battery 48, the other terminal of which is grounded by a wire 50. Optionally, the commutator device may be connected with the ignition switch so that there is no drain on the battery when the car is idle.

The coil of the link 28 is connected to ground by a wire 52 and, by a wire 54, to a thermal switch 56 the exact construction of which will be described hereinafter. The switch 56 is also connected by a wire 58 to the wire 46. A third wire 60 leads from the switch 56 to the secondary 61 of the transformer 44 and a fourth wire 62 is connected through the rheostat 64 with the other terminal of the said secondary. The rheostat is adjustable from the dash-board of the vehicle by means of a knob indicated at 66.

Construction of the link 28

Referring to Figure 2, the electrical link 28 is shown enlarged and in section and will be seen to comprise a casing 68 which is joined at its right end to the portion 21 of the rod 20 and reciprocably receives at its left end the portion of the rod 20 which is connected with the butterfly 18. Mounted within the case 28 is a coil 70 to which is connected the wires 52 and 54. The coil 70 has associated therewith an armature 72 attached to the rod 20 in any convenient manner. A spring bears between the said armature and the right end of the case 68 so that the assembly comprising the rods 20, the link 28 and the rod 21 is continuously urged into its extended position. It will be apparent that energization of the coil 70 will draw the armature 72 rightwardly within the said coil, shortening the rod leading to the butterfly 18 thus moving the latter toward its closed position.

Construction of the switch 56

The construction of the switch 56 is shown in detail in Figure 3 wherein the switch will be seen to comprise a case 80 which has a cover plate 82. Mounted within the case 80 is a bi-metal strip 84 which carries on its free end a contact 86 adapted for engagement with the contact 88 in the cover 82. Connected with the fixed end of the strip 84 is the wire 54 while the wire 58 is connected with the fixed contact 88.

Surrounding or otherwise intimately associated with the strip 84 is an electric heater 90 which is connected to the wires 60 and 62. The heater 90 is adapted to heat the bi-metal strip so as to cause it to bend in response to the passage of current through the said heater wire. The bi-metal strip may comprise any of several well known different combinations of metal which, having different coefficients of expansion, bend when changed in temperature. The strip 84 is arranged so that the contact 86 moves toward the contact 88 as the temperature of said strip is increased while the opposite action takes place when the temperature is decreased.

Construction of the commutator device 36

The commutator device 36 is more particularly shown in Figures 4 and 5 where it will be seen to comprise a casing or frame 92 through which the drive shaft 94 of the speedometer cable 32 passes to the speedometer 34. Affixed to the drive shaft 94 is a commutator 96 which comprises a plurality of oppositely disposed contactor bars 98 which are carried by a suitable insulating means 100. The opposite bars of the commutator are connected together in any suitable manner, such as by wires as is shown in Figure 5.

The case 92 is likewise of insulating material and has mounted therein on opposite sides of the commutator 96 the brushes 102 and 104 which are connected, respectively, to the wires 38 and 40. It will be apparent that the arrangement is such that the current which passes between the brushes 102 and 104 will pulsate at a rate which is proportional to the speed at which the commutator 96 is rotated by the driving shaft 94 of the speedometer cable.

It will be obvious that other commutator constructions are possible as, for example, a stamping comprising the bars, the stamping being joined to the driving shaft whereby one brush is eliminated and the cost of construction reduced.

Operation of the modification of Figure 1

In operation, the engine 10 is started and the lever 26 is depressed in order to actuate the rods 20 and 21 to open the butterfly valve 18 a predetermined amount. After the vehicle has been started, the speed thereof is indicated on the speedometer 34 by the rotational speed of the drive shaft 94 of the cable 32. As the drive shaft 94 rotates, the commutator 96 also rotates and pulses of current pass from the battery 48 through the wire 46 and the primary 42 of the transformer 44, the wire 40, the commutator device 36 and wire 38 to ground the circuit being completed to the battery from ground through the wire 50. The pulses of current which flow through the primary 42 are transformed in the transformer 44 into pulses of current which flow from the secondary through the wire 60, the heater coil 90, the wire 62 and the rheostat 64 back to the said secondary.

The current flowing through the heater coil 90 heats the bi-metal strip 84 and causes it to bend bringing the contact 86 toward the contact 88. As the car speed increases, the frequency of the pulses of current flowing through the primary coil 42 increases and the transformation of power into the secondary coil 61 is increased in efficiency. Thus, as the car speed increases, the current flowing through the heater coil 90 also increases and the temperature of the bi-metal strip 84 is raised until the contact 86 engages the contact 88 and completes a circuit between the wires 54 and 58.

When the wires 54 and 58 are connected a current flows from the battery 48 through the wires 46, 58, 54, coil 70 and wire 52 to ground, thus energizing the said coil. The energization of the coil 70 draws the armature 72 rightwardly so that the rod 20 also moves rightwardly and the butterfly 18 is moved toward its closed position. The casing 68 of the link 28 and the rod 21 are maintained in position by the spring 23 attached to the right end of the said rod.

It will be apparent that the influence of the secondary coil 61 on the heater coil 90 may be controlled by the setting of the rheostat 64 so that the contacts 86 and 88 will engage in response to any predetermined speed which the vehicle operator may select by the adjusting knob 66.

The amount of movement of the butterfly 18 brought about by the actuation thereof by the link 28 is sufficient substantially to reduce the speed of the vehicle. Then, when the vehicle speed has reduced below the aforementioned predetermined selected speed, the contacts 86 and 88 move apart due to the cooling of the bi-metal strip 84 and the original throttle setting is restored.

Referring to Figure 9, the currents in the primary and secondary of the transformer 44 are graphically illustrated. The curves at A indicate the conditions at a predetermined engine speed while the curves at B indicate conditions at a higher engine speed. In A the pulsating current in the primary coil 42 is indicated by the line 150 which, it will be seen, consists of a series of spaced pulses. At the beginning and the end of the current pulses a current is induced in the secondary 61 which is represented by the shaded areas 152. Thus, a pulse of current is introduced in the said secondary winding each time the primary circuit is closed or opened.

In the curves at B the primary current comprises a series of pulses 154 which are spaced substantially closer than the pulses 150 due to the increased engine speed. The current induced in the secondary is indicated by the shaded areas 156 which, as before, occur at the beginnings and ends of the pulses 154. It will be noted that the pulses 156 are substantially closer than the pulses 152 and that, therefore, the average value of heating current for the heater 90 is substantially greater at B than it is at A. Thus, as the engine speed or car speed increases, the bi-metal strip 84 is raised in temperature until the contacts 86 and 88 close to energize the solenoid 70.

*Modified arrangement of thermal switch*

In Figure 6 is illustrated a modified arrangement of the thermal responsive switch in which has been included a means for compensating for the ambient temperature. This view, which is similar to Figure 3 bears corresponding numerals with a subscript a for corresponding parts and is distinguished from the structure of Figure 3 by the bi-metal strip 110 which is mounted in the case 80a and which replaces the contact 88. The strip 110 is formed so that as the ambient temperature increases the contact 112 moves leftwardly away from the contact 86a. Then, when the strip 84a is heated by the current passing through the heater 90a, the calibration of the control system remains substantially constant despite variations in the ambient temperature. It will be apparent that the compensating strip 110 could be mounted in the instrument in a variety of manners so as to influence the contact 112 or the contact 86a and that equivalent results would obtain.

*Modified construction of Figure 7*

Figure 7 illustrates a modification wherein the butterfly valve is actuated in response to speeds in excess of a predetermined maximum and also in response to speeds below a predetermined minimum. The various portions of Figure 7 which correspond to portions of Figure 1 are similarly numbered but with the addition of a subscript b. In Figure 7 the link 28b is slidably mounted in a track 120 and is pivotally joined to the rod 20b by the rod 122 which has attached thereto an armature 124 which is urged into its Figure 7 position by a pair of springs 126 and 128. The link 28b is manually adjusted by the rod 21 and is carried by the track 120 in order to relieve the control rods 20 and 21 of its weight.

Mounted within the case 68b of the link are a pair of coils 130 and 132 which are adapted, when energized, to urge the armature 124, respectively, leftwardly or rightwardly. The coils 130 and 132 are connected to ground by the wires 134 and 136, respectively, and are also connected by the wires 138 and 140 with the contacts 142 and 144, respectively. The contacts 142 and 144 are fixed in the case 80b of the switch 56b and lie on either side of the bimetal strip 84b which carries at its free end a pair of contacts 86b and 146.

The arrangement is such that when the strip 84b is heated by the current flowing through the heater 90b the said strip bends to bring the contact 86b toward the contact 144 so that when contact is made therebetween, the coil 132 is energized to move the rod 122 and 20b rightwardly thus to urge the butterfly 18b toward its closed position. Also, when the strip 84b cools, the contact 146 is moved toward the contact 142 so that when contact is made therebetween the coil 130 is energized and, through the armature 124, moves the rods 122 and 20b leftwardly to urge the butterfly 18b toward its open position. Thus, the control device of Figure 7 may be adjusted to control both maximum and minimum speeds of the vehicle or engine.

It will be apparent that rheostats similar to the one shown at 64 in Figure 1 could be arranged in the circuit of Figure 7 to adjust the range of the control system and its sensitivity. Also, it will be obvious that a compensating strip or strips similar to the one indicated at 110 in Figure 6 could be employed in association with the switch 56b so as to compensate in variations in ambient temperature if desired.

*Modified construction of Figure 8*

Figure 8 illustrates the modified construction similar to the construction of Figure 1 and bears corresponding numerals for corresponding parts with the addition of a subscript c. In Figure 8 the source of power for the primary 42c of the transformer 44c is derived from an alternator at 150 which is driven through the pulley 152 by the belt 154 which runs over a pulley 156 on the drive shaft of the engine 10c. The frequency of the alternator is, therefore, directly proportional to the speed of the engine and the power developed in the secondary 61c is, therefore, proportional to the speed of the engine and also to that of the vehicle when the transmission is in high gear. In a manner similar to that set forth in connection with Figures 1 and 7, the control system comprising the link 28c and the switch 56c function to control the maximum speed of the engine or vehicle at some predetermined value.

It will be apparent that the transformer 44c could be eliminated from this circuit by selecting a heating coil of the proper characteristics. In that case the alternator would directly supply the heating coil of the bi-metal strip.

It will be apparent that the construction illustrated in Figure 8 could be modified to include the feature of controlling the minimum speed of the engine or vehicle as shown in Figure 7, if desired. It will also be evident that the control system of Figure 8 could include compensating bi-metal strips similar to the one indicated at 110 if found desirable or necessary and further that one or more adjustable rheostats as indicated at 64 in Figure 1 could be included in order to adjust the range and sensitivity of the control device.

Still another modification contemplated by my invention would be the replacement of the commutator device by a distributor switch such as is employed on engines and the speed of which is in direct proportion with the speed of the vehicle. Under these conditions, as the vehicle speed varies, the speed of the distributor switch also varies and the supply of power to the heating coil of the bi-metal is varied thereby to actuate the control system.

It will be understood that I desire to comprehend within my invention such modifications and changes in construction as may be properly comprehended within the scope of the hereinafter appended claims.

I claim:

1. A governor for a power plant having a source of activating energy comprising means for making and breaking an electric circuit at a rate proportional to the speed of said power plant, and means operable in response to the said making and breaking for controlling the supply of activating energy to said power plant thereby to control the speed thereof, the said means being in one operative position for all rates of said making and breaking less than a predetermined rate and in another operative position for all rates of said making and breaking exceeding said predetermined rate.

2. A governor for an engine which derives its power from a fluid supplied thereto which comprises means for making and breaking an electric circuit at a rate proportional to the speed of said engine, and means for controlling the supply of fluid to said engine comprising electrical means operable in response to the making and breaking of said circuit, the said electrical means being in one operative position for all rates of said making and breaking less than a predetermined rate and in another operative position for all rates of said making and breaking exceeding said predetermined rate.

3. A governor for an internal combustion engine comprising means for interrupting an electric circuit at a rate proportional to the speed of said engine, means for varying the supply of fuel to said engine, and electrical means associated with said last mentioned means and with said circuit interrupting means and operable in response to a predetermined rate of interrupting said circuit for reducing the supply of fuel to said engine thereby to limit its maximum speed, the said electrical means being maintained in fuel supply reducing position so long as the rate of interrupting said circuit exceeds said predetermined rate.

4. A speed control device for an internal combustion engine comprising a first electric circuit, means for interrupting said first circuit at a rate proportional to the speed of said engine, a second electric circuit into which current variations are induced by the interruptions of said first circuit, and means associated with said second circuit for reducing the supply of fuel to said engine in response to a predetermined maximum rate of interrupting said first circuit and to maintain the supply reduced until the said rate of interrupting is reduced.

5. A speed regulator for an internal combustion engine which has an intake manifold and a manually adjustable control valve therein which comprises electrical means operable at least partially to close said valve when energized, a thermal switch adapted in response to a predetermined temperature to energize said electrical means, and means for heating the thermal responsive portion of said switch to a temperature which is a measure of the speed of said engine thereby to energize said electrical means in response to a predetermined maximum engine speed.

6. A speed regulator for an internal combustion engine which has an intake manifold and a manually adjustable control valve therein which comprises electrical means operable at least partially to close said valve when energized, a thermal switch adapted in response to a predetermined temperature to energize said electrical means, an electric heater associated with the thermal responsive portion of said switch, and means for supplying an electric current to said heater which is in proportion to the speed of said engine whereby said electrical means is actuated in response to a predetermined maximum engine speed.

7. A speed regulator for an internal combustion engine which has an intake manifold and a manually adjustable control valve therein which comprises electrical means operable at least partially to close said valve when energized, a thermal switch adapted in response to a predetermined temperature to energize said electrical means, an electric heater associated with the thermal responsive portion of said switch, a circuit for supplying current to said heater, and means for inducing pulsating currents in said circuit, the rate of said pulsations being proportional to the rate of speed of said engine whereby at a predetermined maximum rate of engine speed said electrical means is actuated to reduce the fuel supply to said engine.

8. A speed regulator for an internal combustion engine which has an intake manifold and a manually adjustable control valve therein which comprises electrical means operable at least partially to close said valve when energized, a thermal switch adapted in response to a predetermined temperature to energize said electrical means, an electric heater associated with the thermal responsive portion of said switch, a circuit for supplying current to said heater including the secondary of a transformer, the primary of said transformer being connected serially with a means for interrupting the primary circuit at a rate proportional to the speed of said engine so that said system is operable to actuate said electrical means in response to a predetermined maximum speed of said engine.

9. A speed regulator for an internal combustion engine which has an intake manifold and a manually adjustable control valve therein which comprises electrical means operable at least partially to close said valve when energized, a fixed contact and a movable contact spaced therefrom serially arranged with said electrical means, a bi-metallic thermostatic element attached to said movable contact so that at a predetermined temperature said bi-metallic element moves said contacts together, and means associated with said bi-metallic element and operable to heat the same to a temperature which is a function of the speed of said engine whereby at a predetermined maximum engine speed said electrical means is energized to reduce the fuel supply to said engine.

10. A speed regulator for an engine which has a manually adjustable throttle valve associated therewith which comprises electrical means associated with said throttle operable when energized at least partially to close said valve, a pair of normally open contacts serially arranged in circuit with said electrical means, a bi-metallic thermostatic element adapted in response to a predetermined temperature to close the circuit between said contacts, an electric heater associated with said bi-metallic element, a circuit for supplying heating current to said heater including the secondary of a transformer, the primary of said transformer being serially connected with a commutator device which is driven by said engine so that the rate of interruptions in the primary circuit of said transformer is proportional to the speed of said engine whereby said system is operable to actuate said electrical means in response to a predtermined maximum speed of said engine.

11. A speed regulator for a vehicle which has an engine deriving power from a fluid source and in which the said fluid source is controlled by a manually adjustable valve which comprises an electrical means operable to move said valve toward its closed position when energized, a thermal switch including a bi-metallic strip connected in circuit with said electrical means and adapted in response to a predetermined temperature to energize said electrical means, an electric heater associated with said bi-metallic strip, a transformer having a primary and a secondary, the secondary being connected to the means for heating said bi-metallic strip and the primary being connected in circuit with a circuit interrupter which is driven at a speed proportional to the speed of said vehicle whereby said electrical means is actuated at a predetermined maximum speed of said vehicle.

12. A governor for an engine which derives its power from a fluid supplied thereto which comprises means for intermittently interrupting a circuit at a rate proportional to the speed of said engine, means for controlling the supply of fluid to said engine comprising electrical means responsive to the interruption of said circuit for reducing said supply at a predetermined maximum engine speed, and means selectively adjustable for regulating the response of said last mentioned means whereby said predetermined maximum speed may be adjusted.

13. A speed regulator for an engine which has an intake manifold and a manually adjustable control valve therein which comprises electrical means operable at least partially to close said valve when energized, a thermal switch including a bi-metallic strip adapted in response to a predetermined temperature to energize said electrical means, an electric heater associated with said bi-metallic strip, means for supplying an electric current to said heater in proportion to the speed of said engine whereby said electrical means is actuated in response to a predetermined maximum engine speed, and means including an adjustable resistor serially arranged with said electric heater for adjusting said predetermined maximum speed.

14. In combination with the throttle lever of an engine, a collapsible electrical link, yielding means normally urging said link into its extended position, solenoid-armature means operable when energized to collapse said link against the thrust of said yielding means, thermal responsive means including a bi-metallic strip operable in response to a predetermined temperature for energizing said solenoid thereby to collapse said link, a first circuit including an electric heater associated with said bi-metallic element, a second circuit electromagnetically coupled with said first circuit, means for passing a pulsating current through said first circuit thereby to induce pulses of current to said second current, the rate of said pulses being proportional to the speed of said engine, and an adjustable resistor in said first circuit for controlling the response thereto to the pulses in said second circuit.

15. In combination with the throttle rod of an engine, first electrical means for extending said rod thereby to increase the speed of said engine, second electrical means for shortening said rod threby to decrease the speed of said engine, a pair of normally open contacts serially arranged with each of said first and said second electrical means, thermal responsive means including a bi-metallic strip operable in response to a predetermined temperature for closing the contacts in series with said first electrical means and in response to a predetermined lower temperature to close the contacts in series with said second electrical means, an electric heater associated with said bi-metallic element, and means of supplying a heating current to said heater which is proportional to the speed of said engine whereby both the maximum and minimum speeds of said engine may be regulated.

16. A speed regulator for an internal combustion engine which has an intake manifold and a manually adjustable control valve therein which comprises electrical means operable at least partially to close said valve when energized, a thermal switch adapted in response to a predetermined temperature to energize said electrical means, an electric heater associated with the thermal responsive portion of said switch, a circuit for supplying current to said heater, and means including an alternator driven by said engine for inducing a current in said circuit whereby at a predetermined maximum rate of engine speed said electrical means is actuated to reduce the fuel supply to said engine.

17. A speed regulator for an internal combustion engine which has an intake manifold and a manually adjustable control valve therein which comprises electrical means operable at least partially to close said valve when energized, a thermal switch including a bi-metallic strip adapted in response to a predetermined temperature to energize said electrical means, an electric heater associated with said bi-metallic strip, and means for supplying an electric current to said heater including a generator driven by said engine whereby said electrical means is actuated in response to a predetermined maximum engine speed.

18. A governor for a vehicle having a power plant which is controlled by a manually adjustable throttle rod which comprises first electrical means operable to move said rod toward speed decreasing position when energized, second electrical means operable to move said rod toward speed increasing position when energized, contacts serially arranged with said first and said second electrical means, a bi-metallic thermostatic element adapted in response to a predetermined temperature to close the contacts in series with said first electrical means and in response to a predetermined lower temperature to close the contacts in series with said second electrical means, means associated with said bi-metallic element and operable to heat the same to a temperature which is a function of the speed of said vehicle whereby to maintain the speed thereof between predetermined maximum and minimum limits, means for adjusting said limits, and other bi-metallic elements associated with said contacts for compensating for variations in ambient temperature whereby the calibration of said governor remains substantially constant throughout normal temperature ranges.

19. A governor for a vehicle having a power plant which has manually adjustable speed controlling means associated therewith which comprises electrical means operable to adjust said speed controlling means, switch means including a thermostatic means comprising a bi-metallic strip for energizing said electrical means, other bi-metallic means for compensating for ambient temperature, and means for heating said first mentioned bi-metallic strip comprising an electric heater and a source of electrical energy the output of which is proportional to the speed of said vehicle whereby said electrical means may be actuated at predetermined maximum and minimum vehicle speeds to adjust said speed controlling means to maintain the speed of said vehicle substantially constant.

20. A governor for an engine which has a manually adjustable throttle valve which comprises solenoid-armature means adapted for moving said throttle valve toward speed decreasing position independently of the manual adjusting means therefor, a pair of normally open contacts serially arranged with said solenoid, a first bi-metallic strip operable when heated to move said contacts together, a second bi-metallic strip operable when heated to move said contacts apart, and means for heating said first bi-metallic strip to a temperature which is proportional to the speed of said engine whereby said bi-metallic strip is effective to complete a circuit through said solenoid in response to a predetermined maximum engine speed and said second bi-metallic strip is operable to compensate for variations in ambient temperature thus maintaining said engine speed at a predetermined and substantially unvariable maximum rate.

21. A governor for a vehicle having a power plant with a speed controlling member which comprises, first means to move said member toward speed reducing position, second means to move said member toward speed increasing position, thermal responsive means responsive to a predetermined upper temperature to actuate one of said means and to a predetermined lower temperature to actuate the other of said means, and means including an electric circuit for supplying electrical energy to said thermal responsive means for heating the same, said circuit supplying energy at a rate which is a measure of the speed of said vehicle.

22. A governor for a vehicle having a power plant with an adjustable speed controlling member which comprises, first means operable to move said member toward speed reducing position a predetermined amount and second means operable to move said member toward speed increasing position a predetermined amount, thermal responsive means responsive to a predetermined temperature to actuate said first means and to a predetermined lower temperature to actuate second means, an electric heater for heating said thermal responsive element, and means of supplying electrical energy to said heater at a rate which is a measure of the speed of said vehicle whereby the speed thereof is maintained between predetermined limits.

23. A governor for a vehicle which has a power plant with an adjustable speed controlling member which comprises, manual means to position said member at any predetermined setting, first and second means operable respectively to move said member from said setting toward speed reducing or speed increasing position, thermal responsive means responsive to a predetermined temperature to actuate one of said means and in response to a predetermined lower temperature to actuate the other of said means, an electric heater associated with said thermal responsive means, means of supplying electrical energy to said heater at a rate which is proportional to the speed of said vehicle, and means of adjusting the speeds at which said thermal responsive means actuates said first or second means.

24. A governor for a vehicle having a driving engine with a speed controlling member which comprises means operable to move said member toward speed reducing position when actuated, said member being automatically held in or returned to speed increasing position when said means is not actuated, thermal responsive means adapted in response to a predetermined temperature to actuate said means, and means for heating said thermal responsive means to a temperature which is a measure of speed of said vehicle thereby to actuate said means in response to a predetermined maximum vehicle speed.

25. A speed regulator for an internal combustion engine having an intake manifold and an adjustable control valve therein which comprises, first means operable to move said valve toward speed decreasing position and second means operable to move said valve toward speed increasing position, thermal responsive means adapted in response to a predetermined temperature to actuate one of said means and in response to a predetermined lower temperature to actuate the other of said means, an electric heater for heating said thermal responsive means, and means of supplying electrical energy to said heater in direct proportion to the speed of said engine.

CHARLES A. LEONARD.

REFERENCES CITED

The following references are of record in the file of this patent:

UNITED STATES PATENTS

| Number | Name | Date |
|---|---|---|
| 1,345,539 | Fynn | July 6, 1920 |
| 1,390,510 | Douglas et al. | Sept. 13, 1921 |
| 1,424,140 | Replogle | July 25, 1922 |
| 1,767,609 | Murray | June 24, 1930 |
| 2,176,739 | Howard | Oct. 17, 1939 |
| 2,204,492 | Heintz | June 11, 1940 |
| 2,236,145 | Kolb | Mar. 25, 1941 |
| 2,410,998 | Reavis | Nov. 12, 1946 |